United States Patent [19]

De Jongh et al.

[11] 4,340,698
[45] Jul. 20, 1982

[54] POWDER COATING

[75] Inventors: Rudolph O. De Jongh, The Hague; Adrianus Visser, Maassluis; Robert Van der Linde, Zwolle, all of Netherlands

[73] Assignee: Internationale Octrooi Maatschappij "Octropa" B.V., Rotterdam, Netherlands

[21] Appl. No.: 243,053

[22] Filed: Mar. 12, 1981

Related U.S. Application Data

[63] Continuation of Ser. No. 87,322, Oct. 23, 1979, abandoned.

[51] Int. Cl.³ ............................................. C08L 63/00
[52] U.S. Cl. ..................................... 525/438; 525/934
[58] Field of Search .......................................... 525/438

[56] References Cited

U.S. PATENT DOCUMENTS

| | | | |
|---|---|---|---|
| 3,576,903 | 4/1971 | Groff | 525/438 |
| 3,882,187 | 5/1975 | Takiyama | 525/438 |
| 3,966,836 | 6/1976 | Cleur | 525/438 |
| 3,979,477 | 9/1976 | Schmid | 525/438 |
| 4,065,438 | 12/1977 | Verborgt | 525/438 |
| 4,092,295 | 5/1978 | Takamori | 525/438 |
| 4,101,518 | 7/1978 | Takamori | 525/438 |
| 4,112,012 | 9/1978 | Cleur | 525/438 |
| 4,140,728 | 2/1979 | Hahn | 525/438 |
| 4,147,737 | 4/1979 | Sein | 525/438 |
| 4,288,569 | 9/1981 | Rottmaier | 525/438 |

FOREIGN PATENT DOCUMENTS 2405330  9/1974  Fed. Rep. of Germany.
2659419  7/1977  Fed. Rep. of Germany.

*Primary Examiner*—Paul Lieberman
*Attorney, Agent, or Firm*—Barry Kramer

[57] ABSTRACT

The invention provides powder coatings based on carboxyl terminated polyester, an epoxy compound and a choline compound of the formula $$[Y-CH_2-CH_2-N-(CH_3)_3]_n{}^+ X^{n-}$$

in which X is OR or

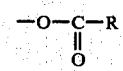

and R is H or a $C_{1-40}$ group and $X^{n-}$ is an anion preferably Y represents OH or a

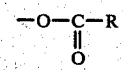

group. The powder coatings are less prone to yellowing and non-toxic.

7 Claims, No Drawings

POWDER COATING

This is a continuation of application Ser. No. 087,322, filed on Oct. 23, 1979, now abandoned.

The application relates to a powder coating, comprising a mixture of a polyester with terminal carboxylic acid groups, an epoxy compound and a curing catalyst.

Powder coatings of this composition are known from the prior art, such as from Netherlands patent applications Nos. 7117721 (Example IV) and 7308965 (the sole Example). The curing catalysts incorporated in these powder coatings for the reaction of carboxyl groups and epoxy groups are as a rule tertiary amines, optionally quaternized.

It is also known from Belgian patent specification No. 676,510 to use in such powder coating systems a curing catalyst consisting of a synergistic mixture of quaternary ammonium salts. The cation of these salts is an ammonium ion in which at least one $C_{12}$–$C_{20}$ alkyl group occurs, the other groups being hydrogen or $C_1$–$C_8$ alkyl groups. As for the anions, there is one carboxylate ion with a tertiary alpha-carbon atom present, as well as a dialkylsulfosuccinate anion.

French patent specification 1,282,310 describes coating agents consisting of an epoxy resin, an anhydride derived from a di- or polycarboxylic acid, and an ammonium phenolate as curing catalyst. The phenolates concerned are those derived from certain substituted phenols, while the ammonium ion contains at least one alkyl, hydroxyalkyl or aralkyl group and the other three groups are either hydrogen atoms or an alkyl, hydroxyalkyl or aralkyl group. Only one quaternary ammonium compound containing a hydroxyalkyl group is mentioned specifically, namely the phenolate derived from 2-ethylaminoethanol.

In actual practice 2,4,6-tris(dimethylaminomethyl)-phenol (DMP) and dimethylbenzylamine (DMB) are used in polyester epoxy powder coatings.

Adhering to the use of these known curing catalysts are one or more of the following disadvantages: they cause yellowing of the coating, they are often toxic and often relatively high weight percentages have to be added in order to obtain a satisfactorily rapid curing reaction and at the same time good mechanical properties of the ultimate coating.

It has now been found that by using certain curing catalysts a better balance of the above-mentioned properties can be obtained. According to the invention, as catalyst for the powder coating a small amount is incorporated of a choline compound having the formula:

$$[Y-CH_2-CH_2-N+(CH_3)_3]_n{}^+X^{n-},$$

in which Y is an —OR or

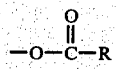

group, in which R is H or a hydrocarbyl group containing 1–40 carbon atoms and in which $X^{n-}$ is an anion, preferably a non-toxic anion, and n a whole number from 1–3.

Consequently, according to the invention, salts of choline, of choline ethers and of choline esters are used in powder coatings.

Preferably n is equal to 1 and the anion $X^{n-}$ represents an acid radical, in particular a halide or a monovalent carboxylate ion, in which the number of carbon atoms is between 1 and 20. Preferably Y is OH or an

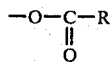

group, in which R is an alkyl group containing 1–20 carbon atoms. So, for example, choline chloride, choline bromide, choline iodide, choline acetate, choline propionate, choline benzoate, choline p.tert. butyl benzoate and choline p. toluene sulfonate (tosylate) can be used as such salts.

Choline salts and choline ester salts generally yield better results than ethers.

Therefore the following choline esters can also be used: O-acylcholine salts, such as O-acetyl-, O-propionyl-, O-butyryl-, O-caproyl-, O-myristoyl-, O-palmitoyl- and O-stearoyl-choline salts. Less simple esters can also be used, e.g. partial esters, choline-containing phospholipids like lecithin. Further, choline ether salts can be used, like trimethyl(2-alkoxyethyl)ammonium salts in which the alkoxy group can e.g. be a methoxy, butoxy, dodecyloxy or palmitoxy group.

The amount of catalyst in the powder coating is, as a rule, between 0.1 and 5, based on the weight of the polyester resin. Preferably, however, between 0.3 and 3 is used.

The polyester with terminal carboxyl groups, used in the powder coating according to the present invention, has as a rule an acid number between 30 and 150, preferably from 40–100 and a hydroxyl number below 10, preferably below 5. Further, the glass transition point is within the range of 40° to 100° C.

Polyester resins, which are used according to the invention, are mainly built up from divalent alcohols and dicarboxylic acids, although lower percentages, to about 15, of mono-functional chain stoppers or e.g. trifunctional material (triols or tricarboxylic acid) can be present. The most usual divalent alcohols are ethyleneglycol, propyleneglycol, butyleneglycol and neopentylglycol and higher functional alcohols such as glycerol, trimethylolethane, trimethylolpropane and pentaerythritol.

The dicarboxylic acid most used are adipic acid, maleic acid, fumaric acid, phthalic acid, isophthalic acid, terephthalic acid and dimeric fatty acids. Tricarboxylic acids such as trimellitic acid or tetracarboxylic acids such as pyromellitic acid can also be used.

Monovalent alcohols, such as e.g. cetylalcohol, or stearylalcohols and/or monocarboxylic acids such as benzoic acid or stearic acid can also be used. It is also possible to incorporate in the reaction mixture e.g. acid anhydrides, lower esters of carboxylic acids or epoxy compounds. In view of the fact that a high acid number is desirable, an excess of carboxylic acid should be present in the reaction mixture. The esterification can take place in one or more steps.

The polyester resins are prepared according to esterifying and/or interesterifying methods which are known in the art using the reactants indicated above.

The epoxy compound that is used as cross-linking agent in the powder coating according to the present invention has as a rule an average of two or more epoxy groups per molecule. Since incompletely epoxidized material can also be used, the average number of epoxy groups per molecule can be somewhat less than two.

The relative amounts of polyester and epoxy compound are dependent on the reactivity of the polyester (the acid number) and the epoxy equivalent weight of the epoxy compound. In practice 20-80% by weight, preferably 40-60% by weight of epoxy compound, based on the total resin composition, will be incorporated.

Preferably used epoxy compounds are e.g. Epikote resins (ex Shell), that is to say reaction products of bisphenol-A with epichlorohydrin and reaction products of phenol-novolak resins with epichlorohydrin.

The powder coating according to the invention can be prepared by intimately mixing-preferably melt-mixing e.g. in an extruder-a polyester with terminal carboxyl groups, an epoxide compound, the above-described choline compound and possibly other substances, such as pigments, colorants, flow control agents and suchlike, allowing the melt to cool and by breaking this and grinding it to a homogeneous powder, so as for example in a hammer mill, namely to a free-flowing powder varying in particle size from about 20 to 150 microns. The free-flowing powder thus obtained can be sieved in order to obtain the particle size wanted for the specific kind of application.

The powder coatings obtained can also contain various known additives, such as for example flow control agents, surface-active substances, organic or inorganic pigments, inert fillers, inhibitors and softeners.

When such additives are used, these will as a rule be added before the composition is introduced into the mixing device-mostly an extruder. Thereafter, if desired, the composition is also broken and ground to powder and, if need be, sieved. These powders are suitable for application by electrostatic spraying or fluidised bed processes.

After application of the powder coating to the substrate, e.g. by means of electrostatic spraying, the coatings are cured at a temperature of 120° C. to 250° C. for a period of 5-60 minutes. The curing treatment is preferably carried out at 150° to 220° C. for 10 to 40 minutes.

In this manner articles—mostly of metal—are obtained which are completely or partly coated with an enamel layer, obtained by curing of a powder coating which comprises a polyester with free carboxyl groups, an epoxy compound and a choline compound as hereinbefore described.

The powder coating according to the present invention is particularly suitable for the coating of material that can come into contact with foodstuffs, such as e.g. conserve cans, metal lids for glass pots, refrigerators and suchlike. Because of their special properties the powder coatings according to the invention are very suitable for the coating of other articles such as e.g. hospital beds and children's toys.

The invention will now be described with reference to the following tests and examples:

DETERMINING CATALYTIC ACTIVITY

In order to measure the influence of different tertiary amines and/or quaternized derivatives on the reaction rate of epoxy compounds with carboxyl compounds, the reaction rates were determined in an organic solvent.

As epoxy compound, glycidyl ester of branched $C_{10}$, so-called Versatic acids (Cadura E 10), or phenylglycidyl ether was used, and as carboxyl compound benzoic acid, while diethyleneglycol dimethyl ether dried over sodium (Diglyme) was used as solvent. The different tertiary amines/quaternary salts were either obtained from the trade or were prepared as described in brief below.

A weighed amount of the epoxy compound (32 m. equiv.) dissolved in 74 ml Diglyme was heated to the reaction temperature (133° C.). Subsequently the acid (benzoic acid 32 mmol) and the catalyst to be investigated (0.24 mmol) were added together quickly. This time was taken as t=0. During the reaction two samples were taken each time and weighed. One of the samples was dissolved in a 1:1 mixture of acetic acid and chlorobenzene and titrated with a standard solution of HBr in acetic acid with crystal violet as indicator.

The other sample was dissolved in ethanol which was neutralized with respect to phenolphthalein and titrated with a standard ethanolic KOH solution with phenolphthalein as indicator. From this the total concentration of acid or epoxy present in the reaction mixture was calculated.

For the calculation of the reaction rate constant use was made of known techniques such as described in S. W. Benson: The Foundations of Chemical Kinetics, MacGraw Hill Inc., 1960, Chapter II.

In a number of cases a pseudo first order reaction gave the best fit; in other cases a pseudo second order reaction.

TABLE I

CARDURA E 10

| Catalyst | conc. $10^{-3}$ mol/l$^{-1}$ | pseudo second order K $10^{-5}$ lmol$^{-1}$sec.$^{-1}$ |
|---|---|---|
| Choline iodine | 3.22 | 22.3 |
| Choline iodide | 3.26 | 22.0 |
| D.M.P. | 2.07 | 11.5 |
| D.M.P. | 2.91 | 16.2 |

TALBE II

PHENYLGLYCIDYL ETHER

| Catalyst | conc. $10^{-3}$mol/l$^{-1}$ | pseudo first order K $10^{-5}$sec.$^{-1}$ | pseudo second order K $10^{-5}$lmol$^{-1}$sec.$^{-1}$ |
|---|---|---|---|
| Choline chloride | 4.00 | 5.3 | |
| Choline chloride | 4.14 | 7.7 | |
| Choline iodide | 3.33 | 6.2 | |
| Choline tosylate | 4.15 | 3.7 | |
| Choline benzoate | 4.02 | 6.4 | |
| O-Acetyl choline iodide | 3.25 | | 23.2 |
| O-butyryl choline iodide | 3.27 | | 20.4 |
| O-Stearoyl choline iodide | 3.31 | | 24.2 |
| Stearoyl oleoyl lecithin | 3.51 | 1.9 | |
| D.M.P. | 2.55 | 6.7 | |
| D.M.P. | 2.53 | 6.2 | |
| D.M.B. | 3.27 | | 11.0 |
| No catalyst | | 0.14 | 0.36 |

METHODS OF PREPARATION

The choline ester salts can be prepared according to the following general method of preparation.

A solution of 0.5 mol N,N-dimethylaminoethanol was slowly added to a solution of 0.5 mol acyl chloride in 500 ml dry ether.

Upon completion of the addition, the mixture was refluxed for 1 hour. After cooling, the precipitate was, filtered off, dissolved in water and, after acidification, extracted with ether. The ether layer was dried and evaporated. The residue was distilled. The thus obtained N,N-dimethylaminoethyl ester of the carboxylic acid used was subsequently converted in ether with methyl iodide to the quaternary ammonium salt. The raw reaction product was recrystallized from methanol. In this manner, via N,N-dimethylaminoethyl acetate b.p. 84°–85° C. (9.3 kPa)
N,N-dimethylaminoethyl butyrate b.p. 106°–109° C. (7.3 kPa) and
N,N-dimethylaminoethyl stearate b.p. 178°–182° C. (26.6 kPa)

the following salts were prepared:
O-acetylcholine iodide m.p. 155°–157° C.
O-butyrylcholine iodide m.p. 87°–89° C. and
O-stearoylcholine iodide m.p. 228°–230° C. (decomp.).

The choline ether salts can be prepared either as described in German patent specification 682,392 followed by quaternization in a known manner, or according to methods analogous to the preparation of trimethyl-(2-butoxyethyl)ammonium iodide described below.

5.8 g (0.25 mol) sodium was added to a solution of 22 g (0.25 mol) N,N-dimethylaminoethanol in 350 ml dry toluene. After all the sodium had reacted, 35 g (0.25 mol) butyl bromide was added and the reaction mixture was subsequently refluxed for 2 hours. The reaction mixture was then cooled and washed with water. The toluene layer was extracted with dilute hydrochloric acid. The aqueous layer was subsequently rendered basic with respect to phenolphthalein and extracted with ether. The ether layer was dried and ether evaporated off. The residue was distilled. The dimethyl(2-butoxyethyl)amine obtained had a boiling point of 163°–164° C.

The tertiary amine was quaternized as follows:

10 g dimethyl(2-butoxyethyl)amine and 10 g methyl iodide were stirred in 125 ml ether for 24 hours. The precipitate was filtered off and dried. The trimethyl(2-butoxyethyl)ammonium iodide obtained had a melting point of 71°–73° C.

EXAMPLES I–VI

A. Preparation of polyester resin

In a 6 liter five-necked flask, provided with a stirrer, a thermometer, a distillation column and an inlet for nitrogen, 408 g diethyleneglycol, 1965 g propyleneglycol, 3320 g terephthalic acid and 996 g isophthalic acid were heated to about 195° C. in the presence of 5 g dibutyltin oxide as esterification catalyst.

As appeared from the water distilling over, the esterification got started at this temperature. Thereafter, during a period of 20 hours the temperature was slowly raised to about 235° C., and in the course of this time 900 g water was collected. Subsequently vacuum was applied for an hour and a half and during this period a further 40 g water was withdrawn from the reaction mixture.

Then 576 g trimellitic acid anhydride was added at 235° C. and the mixture was kept at this temperature for a further 5 hours.

Thereafter the reaction mixture was poured out, cooled and pulverized.

A polyester resin was obtained having the following properties:

Acid number: 59 (mg KOH/g).
OH number: 1 (mg KOH/g).
Viscosity at 165° C. (Emila spindle 100): 43 Pa s.
Glass transition temperature (DSC on Mettler TA 2000): 67° C.

B. Preparation of powdered coating product

With the aid of an extruder of the "Buss-Ko-Kneder"-type, a coating product was prepared from the following ingredients (extrusion temperature 130° C., screw 60°, 54 r.p.m.):

348 g polyester resin as described under A.
228 g epoxy resin GT 7004 Araldite (epoxy resin of the bisphenol-A type ex Ciba-Geigy).
1.4 g catalyst (compare Table III).
4.5 g benzoin.
30 g Masterbatch (this contained 80 g GI 7004 Araldite and 20 g Acronal 4 F (polybutylacrylate ex BASF) per 100 g).
300 g $TiO_2$ rutile-type pigment (Cl-810 ex Kronos).

The extrudate was cooled, pulverized and ground to a fine powder that was sieved. Particles of $<90\mu$ were obtained and used as described below.

C. Treatment of steel panels

Steel panels of 7.5×23 cm were coated with the powder products as described under B), use being made of a manually operated Sames electrostatic spray gun (type RL-50) that worked at 60 kV. The panels were enamelled in an oven at 200° C. for 20 minutes.

The mechanical properties were measured with the aid of a Gardner Impact Apparatus ASTM D 2794-69.

The yellowing was judged visually after the coating had been enamelled for 1 hour at 220° C. The results are given in Table III.

D. Determination of the catalytic activity by means of DSC

Isothermic tests on DSC (Mettler TA 2000) at 180° C. were carried out with about 20 mg of the powder contained under B). The half-life time ($t_{\frac{1}{2}}$ in seconds) was determined from the curves obtained in this manner. The results are given in Table III.

E. Determination of the gelling times

The gelling times of the powder products described under (B) were determined by putting about 200 mg of the powder on a hot plate (180° C.) and stirring with a spatula until the first sign of gelling was observed.

TABLE III

| Example | Catalyst 0.4 g/100 g polyester | $t_{\frac{1}{2}}$ (sec.) | Mechanical properties lbs/sq inch | Yellowing 1 h - 220° C. | Gelling time 180° C. (sec.) |
|---|---|---|---|---|---|
| 1 | Choline chloride | 111 | 160 | + | 125 |
| 2 | O-Acetylcholine iodide | 129 | 160 | ++ | 202 |
| 3 | O-Butyrylcholine iodide | 176 | 100 | + | 225 |
| 4 | O-Benzoylcholine iodide | 212 | 110 | ++ | 250 |
| 5 | Trimethyl-2-butoxyethyl-ammonium iodide | 164 | 160 | + | 200 |

TABLE III-continued

| Example | Catalyst 0.4 g/100 g polyester | $t_i$ (sec.) | Mechanical properties lbs/sq inch | Yellowing 1 h - 220° C. | Gelling time 180° C. (sec.) |
| --- | --- | --- | --- | --- | --- |
| 6 | O-Stearoylcholine iodide | 225 | 140 | + | 325 |
| 7 | Choline benzoate | 210 | 120 | + + | 243 |
| 8 | Choline p. toluenesulfonate | 220 | 10 | + + | 357 |
| Comparison 1 | Dimethylbenzylamine (DMB) | 85 | 120 | — — | 130 |
| Comparison 2 | Trisdimethylaminoethyl-phenol (DMP) | 155 | 160 | — — — | 170 |

+ + practically no yellowing
+ slight yellowing
— — strong yellowing
— — — very strong yellowing

We claim:

1. Powder coating consisting essentially of a mixture of a polyester with terminal carboxyl groups, an epoxy compound having more than one 1,2-epoxy group per molecule and between 0.1 and 5 weight % of a curing catalyst, characterized in that the curing catalyst is a choline compound having the formula:

$$[Y-CH_2-CH_2-N+(CH_3)_3]_n{}^+X^{n-},$$

wherein Y is an —OR or $$-O-\underset{\underset{O}{\|}}{C}-R$$

group in which R is hydrogen or a hydrocarbyl group containing 1 to 40 carbon atoms, and $X^{n-}$ is an anion in which n represents a whole number from 1 to 3.

2. Powder coating according to claim 1, in which Y is hydroxyl.

3. Powder coating according to claim 1, in which Y is $$-O-\underset{\underset{O}{\|}}{C}-R$$

in which R is diallyl group containing 1-20 carbon atoms.

4. Powder coating according to claim 1, in which $X^{n-}$ is a monovalent anion.

5. Powder coating according to claim 4, in which $X^{n-}$ is an ion selected from the group consisting of halides and carboxylates.

6. Powder coating according to claim 1, in which between 0.3 and 3 weight % of the choline compound is present.

7. Process for the preparation of a powder coating according to claim 1, characterized in that the polyester, the epoxy compound and the choline compound, are melt-mixed, the melt is allowed to cool and processed to a powder.

* * * * *

UNITED STATES PATENT AND TRADEMARK OFFICE
CERTIFICATE OF CORRECTION

PATENT NO. : 4,340,698
DATED : July 20, 1982
INVENTOR(S) : R.O. De Jongh et al

It is certified that error appears in the above—identified patent and that said Letters Patent is hereby corrected as shown below:

In the Title Page, add the following item [30]:

--[30] Foreign Application Priority Data

Oct. 31, 1978 [NL] Netherlands....7810813 --.

In Claim 3, first line below the formula, delete "diallyl" and insert in lieu thereof --an alkyl--.

Signed and Sealed this

Twelfth Day of October 1982

[SEAL]

Attest:

GERALD J. MOSSINGHOFF

Attesting Officer     Commissioner of Patents and Trademarks